United States Patent
Vaughan et al.

Patent Number: 5,116,590
Date of Patent: May 26, 1992

[54] CRYSTALLINE ZEOLITE ECR-35 AND A METHOD FOR PRODUCING SAME

[75] Inventors: David E. W. Vaughan, Flemington; Karl G. Strohmaier, Port Murray; Michael M. J. Treacy, Princeton, all of N.J.; John M. Newsam, San Diego, Calif.

[73] Assignee: Exxon Research and Engineering Company, Florham Park, N.J.

[21] Appl. No.: 727,202

[22] Filed: Jul. 9, 1991

[51] Int. Cl.$^5$ .............................. C01B 33/34
[52] U.S. Cl. ........................ 423/328; 502/79; 208/111; 208/120; 208/135
[58] Field of Search .......... 423/328, 329, 330, 118; 502/79; 208/111, 120, 135

[56] References Cited
U.S. PATENT DOCUMENTS 3,415,736  12/1968  Ciric ................................ 423/328
3,972,983  8/1976   Ciric ................................ 423/329

Primary Examiner—R. Bruce Breneman
Attorney, Agent, or Firm—Ronald D. Hantman

[57] ABSTRACT

A synthetic large pore crystalline metalsilicate zeolite composition, designated as ECR-35, having the formula, expressed in term of mole ratio of oxides:

(0.05–0.50) T$_2$O: (0.50–0.95) Na$_2$O:
X$_2$O$_3$: (4–24) SiO$_2$: (0–25) H$_2$O where T is an organic cation selected from the group consisting of tetraethylammonium and methyltriethyl ammonium, and mixtures thereof and X is Al or Ga; wherein the composition consists of an X-ray diffraction pattern having the line intensities:

| Line # | d(Å) | Intensity |
|---|---|---|
| (1) | 15.00 ± 0.2 | weak to very strong |
| (2) | 14.20 ± 0.2 | very strong |
| (3) | 13.40 ± 0.2 | weak to medium |
| (4) | 8.70 ± 0.2 | medium |
| (5) | 8.03 ± 0.2 | zero to medium |
| (6) | 7.40 ± 0.15 | medium |
| (7) | 5.65 ± 0.15 | medium-strong | and wherein the intensity of line (2) is greater than line (1) which is substantially greater than the intensity of line (3); and wherein the intensity of line (4) is substantially greater than the intensity of line (6) which is greater than the intensity of line (5) and a method for preparing same.

19 Claims, 9 Drawing Sheets

CRYSTALLINE ZEOLITE ECR-35 AND A METHOD FOR PRODUCING SAME

BACKGROUND OF THE INVENTION

1. Field of the Invention

The invention relates to large pore structure crystalline aluminosilicate polymorphs, also known as zeolites, containing tetraethylammonium or methyltriethylammonium organic ions.

2. Description of the Prior Art

Large pore crystalline aluminosilicate zeolites having a silica to alumina ratio of at least four are desirable due to their catalytic selectivity and thermal stability. These properties are especially important for zeolites used as catalyst or in absorption processes under high temperatures.

Quaternary ammonium salts are used as templates or reaction modifiers to prepare synthetic zeolites that have a higher silica to alumina ratios than those found in naturally occurring zeolites. For example, U.S. Pat. No. 4,046,859 discloses a method for preparing a ferrierite structure zeolite (ZSM-21) that has a silica to alumina ratio greater than eight using a hydroxyethyl-trimethyl sodium aluminosilicate gel. Barre,, *Zeolites*, Vol. 1, p. 136 (1981) describes a method for obtaining zeolites using various ammonium organic bases as cations or reaction modifier salts to increase the silica to alumina ratio of the zeolite. Similarly, Lok et al., *Zeolites*, Vol. 3, p. 282 (1983) and Breck, *Zeolite Molecular Sieves*, pp. 348–349 (1974), provides a basic overview of zeolites synthesized with alkyl ammonium cations. Tetramethylammonium (TMA) cation containing salts are used as templates in the synthesis of zeolites A, Y and ZSM-4 (mazzite). See, for example, U.S. Pat. Nos. 3,306,992; 3,642,434; 4,241,036 and 3,923,639. However, TMA has a tendency to lodge in the small cavities of the zeolite's cage structure (sodalite or gemlinite cages), and is removed by burning the zeolite at high temperatures. This often leads to a disruption or total collapse of the zeolite cage structure. The the silica to alumina ratio in these structures is typically less than about 6.

Minor changes in the size or electron charge distribution of the organic cations used can induce the formation of different zeolite structures. For example, U.S. Pat. No. 4,046,859 shows that if one of the methyl groups of the TMA is replaced with a hydroxyethyl group, a secondary ferrierite-like phase (ZSM-21) will form in addition to the primary phase. Barrer, *Zeolites*, Vol. 1 (1981), describes other examples of how minor changes in cation distribution can induce the formation of various zeolite structures.

The theoretical structures possible, based on a series of interlinked truncated cubooctahedra (sodalite cages), are discussed in Moore and Smith, *Mineralogical Magazine*, Vol. 35, p. 1008–1014 (1964). The authors describe two types of zeolite structures comprised of connected sheets of linked sodalite cages. The first type has the sheet stacking sequence ABC ABC... (i.e., faujasite) while the second type has the sheet stacking sequence AB AB... and is referred to in the art as "Breck Structure 6" or "Breck 6". This structure is further described by Breck in *Zeolite Molecular Sieves*, p. 58 (1973) as being made of a hexagonal unit cell having the approximate cell dimensions of: a=17.5 angstroms and c=28.5 angstroms. "Breck 6" zeolites, containing the AB AB... stacking sequence, have been designated as ECR-30, see U.S. Pat. No. 4,879,103. In comparing the two structures, the faujasite is made of cubic packed (cp) sodalite cages while ECR-30 is made of hexagonally packed (hp) sodalite cages. Analogous structures of this type are found for carbon, i.e., diamond and lonsdaleite and for zinc sulfide, i.e., sphalerite and wurtzite.

Although, the two structures each contain the same connected sheets of linked sodalite cages, although stacked in different ways, each may randomly intergrow and produce different mixed structural composites known as intergrowths. Intergrowths are well known in zeolite mineralogy due to the increasing use of high resolution lattice imaging electron microscopy, such as that described by Millward et al. in *Proc. Roy. Soc.*, A 399, p. 57 (1985) and by Rao and Thomas in *Accounts of Chem. Res.*, Vol. 18, p. 113 (1985). For example, zeolite T is described in U.S. Pat. No. 2,850,952, and is intergrowth of erionite and offrette. (See, Bennett and Gard, *Nature*, Vol. 214, p. 1005 (1967) and U.S. Pat. No. 3,308,069.) Zeolite beta, has recently been characterized by Treacy and Newsam, *Nature*, Vol. 332, p. 249 (1988)) as an intergrowth of two enantiomorphs.

Various other modifications of the basic faujasite structure may be found in the literature. For example, U.S. Pat. No. 4,309,313, describes CSZ-1 as being made with cesium cations and having an X-ray diffraction pattern indexed on a hexagonal unit cell similar to that proposed for "Breck 6". However, it has recently been shown that CSZ-1 is made of a slightly distorted faujasite structure of twin planes near the center of very thin crystals. See Treacy et al., *Jour. Chem. Soc. Chem. Commun.*, p. 1211 (1986). The twin planes create a strain in the faujasite lattice which causes a rhombohedral distortion in the cubic lattice structure of the faujasite. See Treacy et al, *Analytical Electron Microscopy*, San Francisco Press, p. 161–5, (1987). A faujasite crystal with individual double twin planes has also been observed by Thomas et al. reported in the *Jour. Chem. Soc. Chem. Commun.*, (1981), p. 1221). Another faujasite-like material, ZSM-3, made with lithium and sodium, is described in U.S. Pat. No. 3,415,736. Although, having a hexagonal-like unit cell, similar to that of CSZ-1, the "c" axis of the diffraction plane for ZSM-3 could not be defined. See Kokotailo and Ciric, *Molecular Sieve Zeolites*-1. Amer. Chem. Soc. Adv. Chem. Ser. 101, Ed. Flanigen and Sand., p. 109 (1971). Therefore, ZSM-3 was believed to be made of a random stacking of faujasite and ECR-30 which means that the structure is a random mixture of the cp and hp forms. An infrared analysis of ZSM-3 later showed that it is more disordered than ZSM-20 described in U.S. Pat. No. 3,972,983. See Vaughan et al., Amer. Chem. Soc. Symp. Ser. 398, p. 544, (1989). A recent evaluation of ZSM-20 by Derouane et al., in *Applied Catal.*, Vol. 28, p. 285, (1986) and by Ernst et al. in Zeolites, Vol. 7, p. 180 (1987) describes ZSM-20 as a faujasite-like material having spherical aggregates of twinned chunky crystals and a unit cell capable of being indexed on a hexagonal unit cell. Newsam et al., in *Jour. Chem. Soc. Chem. Commun.*, p. 493, (1989) reported that ZSM-20 was an intimage intergrowth mixture of cp and hp layers with significant amounts of overgrown faujasite crystals.

An analysis of the known structural relationships between various faujasite and ECR-30 materials is summarized below:

TABLE 1

| Zeolite | Si/Al Range | Structure | U.S. Pat. No. |
|---|---|---|---|
| X | 1.0–1.5 | cp | U.S. Pat. No. 2,882,243 |
| Y | 1.5–3.0 | cp | U.S. Pat. No. 3,130,007 |
| CSZ-3 | 1.5–3.5 | cp | U.S. Pat. No. 4,333,859 |
| ECR-4 | 3.0–10.0 | cp | U.S. Pat. No. 4,965,059 |
| CSZ-1 | 1.5–3.5 | distorted cp | U.S. Pat. No. 4,309,313 |
| ZSM-3 | 1.4–2.25 | random cp/hp | U.S. Pat. No. 3,415,736 |
| ZSM-20 | 3.5–infinity | random cp/hp | U.S. Pat. No. 3,972,983 |
| ECR-30 | 3.0–10.0 | hp | U.S. Pat. No. 4,879,103 |
| ECR-32 | 3.0–15.0 | cp | U.S. Pat. No. 4,931,267 |

The morphology of ZSM-3 and ZSM-20, show that both crystals are about 0.6 micron in diameter and about 0.2 micron in thickness and that each has compressed octahedron shapes that are almost hexagonal and similar to the twinned "platelet faujasite" described in U.S. Pat. No. 4,175,059. On the other hand, ECR-30 and CSZ-1 both form thin plates up to about 1 micron in diameter and less than about 0. micron in thickness.

An object of the invention is to provide a intergrowth zeolite structure comprising blocks or zones (nano-crystals) of alternating faujasite and Breck 6 or ECR-30 structural units within the same macro-crystal, wherein the zeolite intergrowth may be characterized as a nano-moziac crystal of intergrown faujasite and ECR-30.

Another object of the invention is to provide zeolites having a basic faujasite sheet linked in a manner so as to form structures having large pores.

Another object of the present invention is to provide a method for producing large pore zeolites having unique structures and a ratio of silica to alumina of at least 4, wherein the organic templates used to formulate the zeolite does not lodge in the small cavities of the zeolite structure, but reside within the super cage structures of the zeolite and may be removed without disrupting or degrading the cage structure.

Other objects of the invention will become apparent to those skilled in the art upon reading the following description, to be taken in conjunction with the specific examples provided herein for illustrative purposes.

SUMMARY OF THE INVENTION

The invention is a synthetic large pore crystalline metalsilicate zeolite composition, designated as ECR-35, having the formula, expressed in term of mole ratio of oxides:

(0.05–0.50) T$_2$O: (0.50–0.95) Na$_2$O:
X$_2$O$_3$: (4–24) SiO$_2$: (0–25) H$_2$O where T is an organic cation selected from the group consisting of tetraethylammonium and methyltriethyl ammonium, and mixtures thereof and X is Al or Ga; wherein the composition consists of an X-ray diffraction pattern having the line intensities:

| Line # | d(Å) | Intensity |
|---|---|---|
| (1) | 15.00 ± 0.2 | weak to very strong |
| (2) | 14.20 ± 0.2 | very strong |
| (3) | 13.40 ± 0.2 | weak to medium |
| (4) | 8.70 ± 0.2 | medium |
| (5) | 8.03 ± 0.2 | zero to medium |
| (6) | 7.40 ± 0.15 | medium |
| (7) | 5.65 ± 0.15 | medium-strong | and wherein the intensity of line (2) is greater than line (1) which is substantially greater than the intensity of line (3); and wherein the intensity of line (4) is substantially greater than the intensity of line (6) which is greater than the intensity of line (5).

In another aspect, the invention is a method for making the crystalline metalsilicate zeolite, ECR-35, having the formula, expressed in term of mole ratio of oxides:

(0.05–0.50) T$_2$O: (0.50–0.95) Na$_2$O:
X$_2$O$_3$: (4–24) SiO$_2$: (0–25) H$_2$O where T is an organic cation selected from the group consisting of tetraethylammonium and methyltriethyl ammonium, and mixtures thereof and X is Al or Ga; wherein the composition consists of a material having an X-ray diffraction pattern having the relative line intensities shown above, and made by a process comprising the steps:

(a) mixing a silica source, an alumina solution, sodium hydroxide, at least one ammonium salt template selected from the group consisting of tetraethylammonium hydroxide and methyltriethylammonium hydroxide and a seeding solution to form a gel having the composition, expressed in terms of mole oxides of ratios, (1.5–12) T$_2$O: (0.6–3) Na$_2$O: Al$_2$O$_3$: (8–30) SiO$_2$: (100–600) H$_2$O, and more preferably has the composition (1.8–11) T$_2$O: (0.6–2.0) Na$_2$O: Al$_2$O$_3$: (9–26) SiO$_2$: (130–450) H$_2$O;

(b) seeding the gel and heating at temperatures ranging from about 90° C. to about 140° C. and for a time sufficient to form crystals; and (c) recovering the zeolite crystals and removing the template from the zeolite.

DETAILED DESCRIPTION OF THE INVENTION

In accordance with the present invention a synthetic large pore crystalline metalsilicate zeolite composition, ECR-35, is produced. The zeolite has the formula, expressed in term of mole ratio of oxides:

(0.05–0.50) $T_2O$: (0.50–0.95) $Na_2O$:
$X_2O_3$: (4–24) $SiO_2$: (0–25) $H_2O$ where T is an organic cation selected from the group consisting of tetraethylammonium and methyltriethyl ammonium, and mixtures thereof and X is Al or Ga; wherein the composition consists of an X-ray diffraction pattern having the line intensities:

| Line # | d(Å) | Intensity |
| --- | --- | --- |
| (1) | 15.00 ± 0.2 | weak to very strong |
| (2) | 14.20 ± 0.2 | very strong |
| (3) | 13.40 ± 0.2 | weak to medium |
| (4) | 8.70 ± 0.2 | medium |
| (5) | 8.03 ± 0.2 | zero to medium |
| (6) | 7.40 ± 0.15 | medium |
| (7) | 5.65 ± 0.15 | medium-strong | and wherein the intensity of line (2) is greater than line (1) which is substantially greater than the intensity of line (3); and wherein the intensity of line (4) is substantially greater than the intensity of line (6) which is greater than the intensity of line (5).

Figure 3:
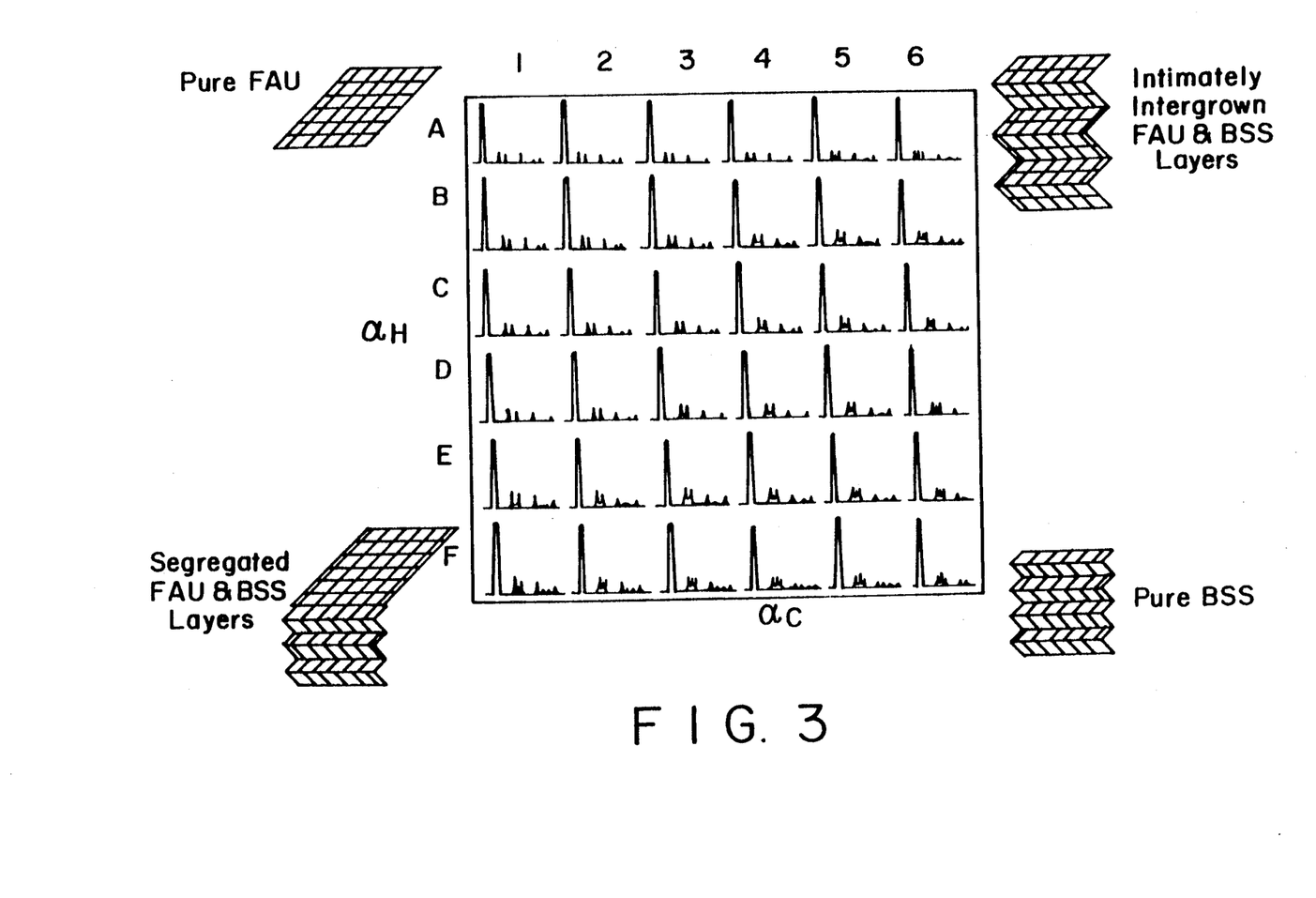
FIG. 3 is a coded matrix of the theoretical X-ray (Cu K$\alpha$) diffraction patterns representative of the stacking sequences determined by the template in FIG. 2 and statistical techniques.

According to the present invention, block intergrowths of ECR-35, defined by the matrix shown in FIG. 3, are made by forming a gel containing a silica source, preferably selected from the group consisting of colloidal silica, particulate silica, fumed silica and aqueous colloidal silica solutions, with a soluble alumina or gallia solution selected from the group consisting of solutions of sodium aluminate, aluminum sulfate, aluminum chloride, aluminum nitrate, sodium galliumate, gallium sulfate, gallium chloride and gallium nitrate salts, and mixtures thereof and a U.S. Pat. Nos. 3,808,326 and 4,178,352, tetraethylammonium and methyltriethylammonium hydroxides and sodium hydroxide.

The preferred ratios of the above reactants are as follows:

|  | Effective Ratio | Preferred Ratio |
| --- | --- | --- |
| Si/Al$_2$ or Ga$_2$ | 8–30 | 9–26 |
| Na/Al or Ga | .6–3 | .6–2 |
| T/Al or Ga | 1.5–12 | 1.8–11 |
| H$_2$O/Al$_2$O$_3$ or Ga$_2$O$_3$ | 100–600 | 130–450 | where T is an organic cation selected from tetraethylammonium (TEA) and methyltriethylammonium (ME3).

The resulting gel will have a composition, expressed in terms of mole oxides of ratios, of (1.5–12) $T_2O$: (0.6–3) $Na_2O$: $Al_2O_3$: (8–30) $SiO_2$: (100–600) $H_2O$, and more preferably will have the composition (1.8–11) $T_2O$: (0.6–2) $Na_2O$: $Al_2O_3$: (9–26) $SiO_2$: (130–450) $H_2O$. The gel composition includes the component.

The gel is then reacted at temperatures between about 90° C. to about 140° C. for a time sufficient to form crystals. Depending upon the specific gel composition, the time required for crystallization will range from about 8 hours to about 30 days without significant impurity formation. The higher silica/alumina (gallia) ratio products usually requiring longer crystallization times. The crystallization time for the gel may be shortened to less than about three days at 100° C. when the preferred gel composition: (8–11) $T_2O$: (1–1.5) $Na_2O$: $Al_2O_3$: (20–26) $SiO_2$: (280–350) $H_2O$ is used.

During the reaction the gel may be stirred, however, stirring does not seem to materially influence formation of the product. Finally, the zeolite crystals are recovered and the template is removed from the zeolite. The non-hydroxyl anion derived from the aluminum acid or gallium acid salt or template solution is inert to the reactants and therefore is not expressed in the formulations. The non-hydroxyl anion is assumed to be a sodium salt, e.g., $Na_2SO_4$, NaCl, etc.

The combination of a low cost reactant source silica, such as colloidal solutions, silica gel, fumed silica, and seeding, as described in U.S. Pat. Nos. 3,808,326 and 4,178,352, offers an important advantage in preparing ECR-35. For example, intergrowth materials, such as ZSM-20, are made from expensive silica sources such as ethoxides or methoxides (TEOS or TMOS).

The resulting ECR-35 products have the X-ray diffraction patterns shown in the coded matrix of FIG. 3, rows C, D and E of columns 1 and 2.

In order to identify the ECR-35 product, the diffraction pattern of the zeolite, as a whole, is necessary. However, ECR-35 is a complex group of block intergrown materials, therefore the relative intensities of two groups of three lines (triads) are used to particularly define the characteristics of the ECR-35 zeolite from structurally related zeolites, such as those listed in Table 1. These triads occur in the diffraction pattern between 15.0±0.2 Å and 13.4–0.2 Å; and between 8.7±0.2 Å and 7.4±0.2 Å.

In accordance with the present invention, the structure and composition of ECR-35 is clearly distinguishable from that of ECR-30, ECR-4/32, ZSM-2, ZSM-3, ZSM-20 and CSZ-1. First, ECR-35 has a Si:Al ratio from about 2:1 to about 12:1. Because of its initially high Si/Al ratio, ECR-35 is particularly desirable as a starting material in the synthesis of zeolites having enhanced Si/Al ratios. However, the ratio can readily be increased by a variety of "secondary synthesis" chemical treatments which usually involve removing the Al or Ga from the zeolite framework thereby creating a metastable defect structure. This is followed by filling the defect structure with Si from another part of the structure by chemical treatment or hydrothermal annealing, or from an external silica source (e.g., SiCl$_4$, (NH$_4$)$_2$SiF$_6$). These processes have recently been reviewed by Scherzer in Amer. Chem. Soc. Symp. Ser. 248, p. 157–200 (1984)). Examples of such treatments include steaming, as described in U.S. Pat. No. 3,293,192; acid leaching, as described in U.S. Pat. No. 3,506,400; using complexing reagents (eg. EDTA), as described in U.S. Pat. No. 4,093,560; using SiCl$_4$ vapor, as described in Beyer and Balenyakja, Catalysis by Zeolites 5, p. 203, (1980), Elsevier Press.; SiCl$_4$ in non-aqueous solvents, as described in WO 88/01254; and CHF$_3$, as described in U.S. Pat. No. 4,275,046. The resulting products are often called 'ultra stable' faujasites because of their enhanced thermal and hydrothermal stability. Finally, another technique for increasing the ratio of Si:Al ratio is using an aqueous solution of (NH$_4$)$_2$SiF$_6$, as described in U.S. Pat. No. 4,503,023. These are general methods of "secondary synthesis" and are by no means limiting examples. Such methods, used in a repetitive mode, may allow the manufacture of pure silica forms of the subject structures (see Scherzer, J. Catal., vol. 54, p. 285 (1978); for a representative treatment for the faujasite endmember structure.)

The preferred composition for the present "as synthesized" zeolite structure, expressed in molar oxide ratios, is 0.05–0.3 $T_2O$: 0.7–0.95 $Na_2O$: $Al_2O_3$: 4–12 $SiO_2$: 0–25 $H_2O$; however, in the most preferred composition the $SiO_2/Al_2O_3$ ratio is greater than about 6:1.

ECR-35 is further differentiated from prior art zeolites in Table 1 by the relative intensities of the peaks in two triads; these are:

14.2 (±0.2)Å > 15.0 (±0.2Å > > 13.4 (±0.2) Å and 8.7 (±0.2 Å) ≧ 7.4 (±0.2 Å) > 8.03 (±0.2) Å

The order of relative intensities of the triad peaks is important in defining ECR-35. The overall range of triad intensities for ECR-35 is illustrated in Table 3.

TABLE 2

| Angstroms | Row Intensities | | | |
|---|---|---|---|---|
| | C | D | E | F |
| 15.00 ± 0.2 | W | W/S | M/VS | S/VS |
| 14.20 ± 0.2 | VS | VS | VS | VS |
| 13.40 ± 0.2 | O | O | W/M | M |
| 8.70 ± 0.2 | M | M | M | M |
| 8.03 ± 0.2 | O | O | W | M |
| 7.40 ± 0.2 | M | M | M | M |

[O = barely detectable; W = weak; M = medium; S = strong; and VS = very strong (usually the strongest peak)]

Figure 1:
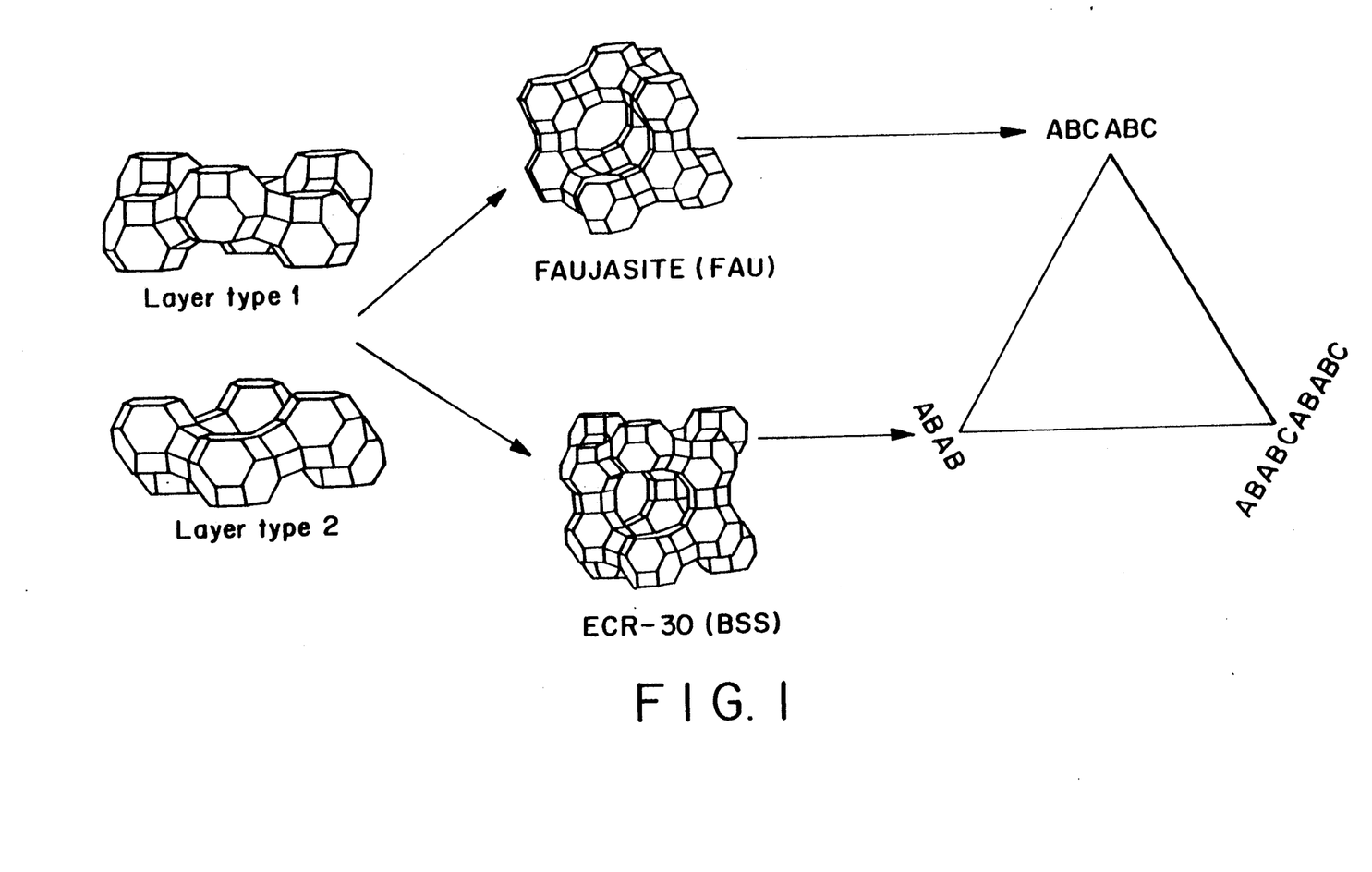
FIG. 1 is a three phase diagram illustrating the range of possible materials obtained from an intergrowth mixture of: faujasite (ABC ABC...), ECR-30 (AB AB...), and a theoretical phase represented by an alternating faujasite and ECR-30 sequence ABC AB ABC AB....

The ordered stacking of the single connected layer of sodalite cages can yield up to three "pure" structural members. These are (1) faujasite (ABC ABC...), (2) ECR-30 (AB AB...) and (3) a 1:1 repeat mixture of faujasite and ECR-30 (ABC AB ABC AB...). These mixed phases form the triangular three-phase diagram shown in FIG. 1, where each pure form occupies a corner of the phase diagram. The interior regions of the triangular diagram represent various intergrowths. FIG. 1 may alternatively be expressed as a probability function, alpha ($\alpha$), where alpha represents the probability that a cp layer (layer 1) (faujasite) is repeated or followed by an hp layer (layer 2) (ECR-30). Note that layer 2 is a mirror image of layer 1. The stacking of only layer 1 or only layer 2 results in faujasite and the alternate stacking results in ECR-30 (Breck structure 6 (BSS)).

Figure 2:
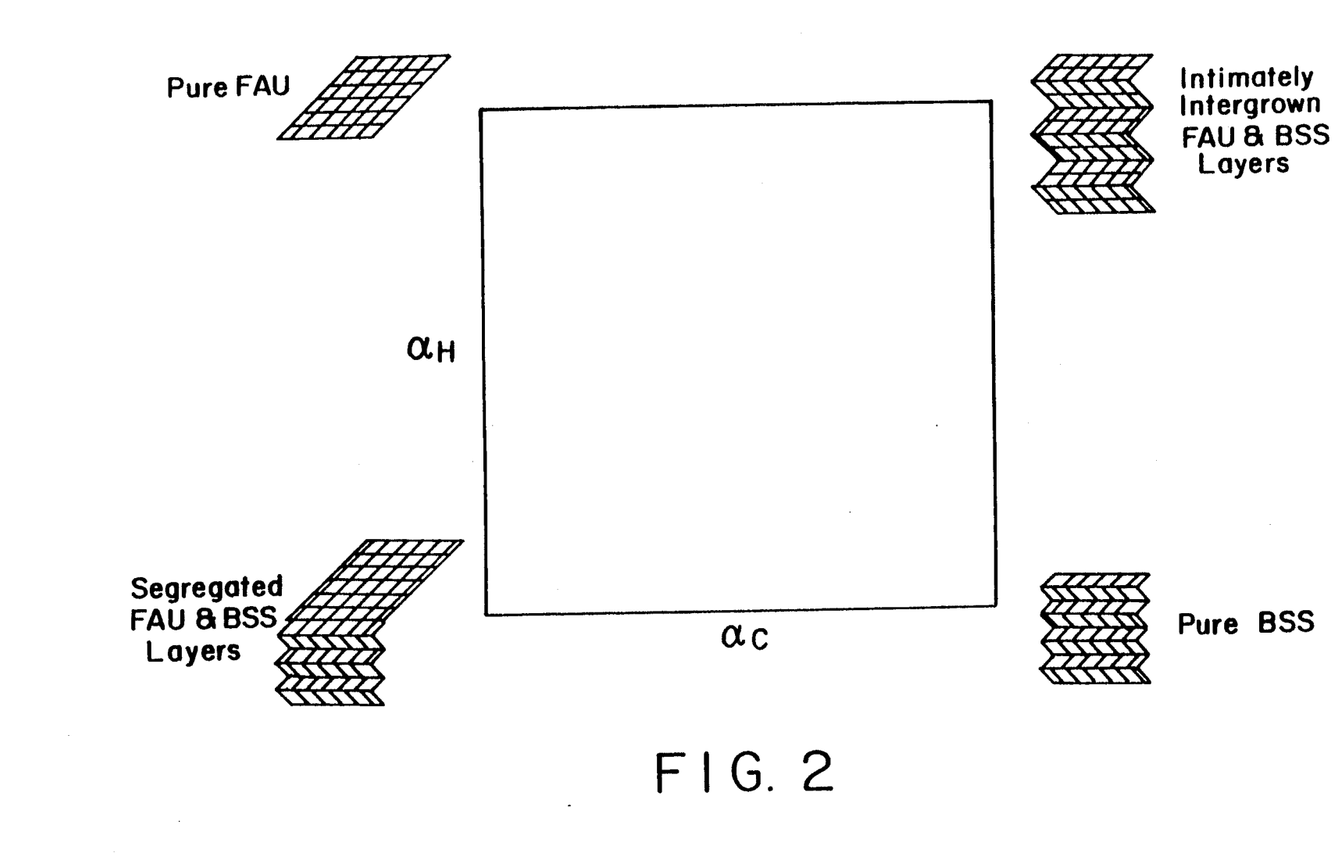
FIG. 2 is the statistical template used in conjunction with statistical techniques to determine the layer stacking probability function, $\alpha$.

The probability may also be expressed as a matrix of intergrowth products, shown in FIG. 2. Once the layering sequence is known, e.g., intimately grown layers or segregated layers of faujasite and ECR-30, a theoretical X-ray diffraction pattern can be determined, using statistical techniques, such as, that described by M. M. J. Treacy et al., "Zeolites for the Nineties", *Intl. Zeolite Assoc.*, Ed. J. C. Jansen et al, p. 285 (1989). There are four generic types of "end-member" layered structures in FIG. 2. These structures represent ordered nano-crystal mixtures of cp and hp type zeolites. One type of structure represents a pure cp layer stacking, structurally equivalent to faujasite. A second type represents a pure hp layer stacking, structurally equivalent to "ECR-30" (BSS). The two remaining structures represent two types of intergrowth 50—50 mixtures of cp and hp layers stackings. In one, the cp and hp stackings are grossly segregated but coherently connected blocks. In the other, the cp and hp stackings are coherently intergrown, such that cp and hp layers stack alternately. The four layering types represent idealized forms of intergrowth mixtures. The interior region of FIG. 2 represents admixtures of certain ratios defined by the parameters $\alpha_c$ and $\alpha_H$, where $\alpha_c$ represents the probability that a layer is attached with hp stacking when the previous layer had been attached with cp stacking, and $\alpha_H$ represents the probability that a layer is attached with cp stacking, when the previous layer had been attached with hp stacking. Hence, an $\alpha_c$ of 0 and an $\alpha_H$ of 1 represent a faujasite structure: an $\alpha_c$ of and an $\alpha_H$ of 0 represent an "ECR-30" structure. Likewise, an $\alpha_c$ of 0 and an $\alpha_H$ of 0 represent a material containing grossly segregated blocks of hp and cp stackings. Additionally, an $\alpha_c$ of 1 and an $\alpha_H$ of 1 represent a material containing intimately intergrown hp and cp stackings. Finally, an $\alpha_c$ of 0.5 and an $\alpha_H$ of 0.5 represent a material where the hp and cp stackings occur as random sequences. The specific crystallization conditions and gel compositions will determine the formation of particular nano-crystal mixtures of cp and hp form zeolites.

If a theoretically determined X-ray diffraction pattern for a given series of intergrowth mixtures is superimposed onto FIG. 2, the matrix of diffraction patterns, shown in FIG. 3, results. The diffraction patterns of FIG. 3 represent Cu-K$\alpha$ radiation and are based on a pure silica zeolite framework where no cations or water molecules are present. The various zeolite intergrowth structures in FIG. 3 are coded in a matrix of elements such that 1 to 6 is the ordinate axis code and A to F is the abscissa code. Coding simplifies the identification of an intergrowth structure type.

Figure 4:
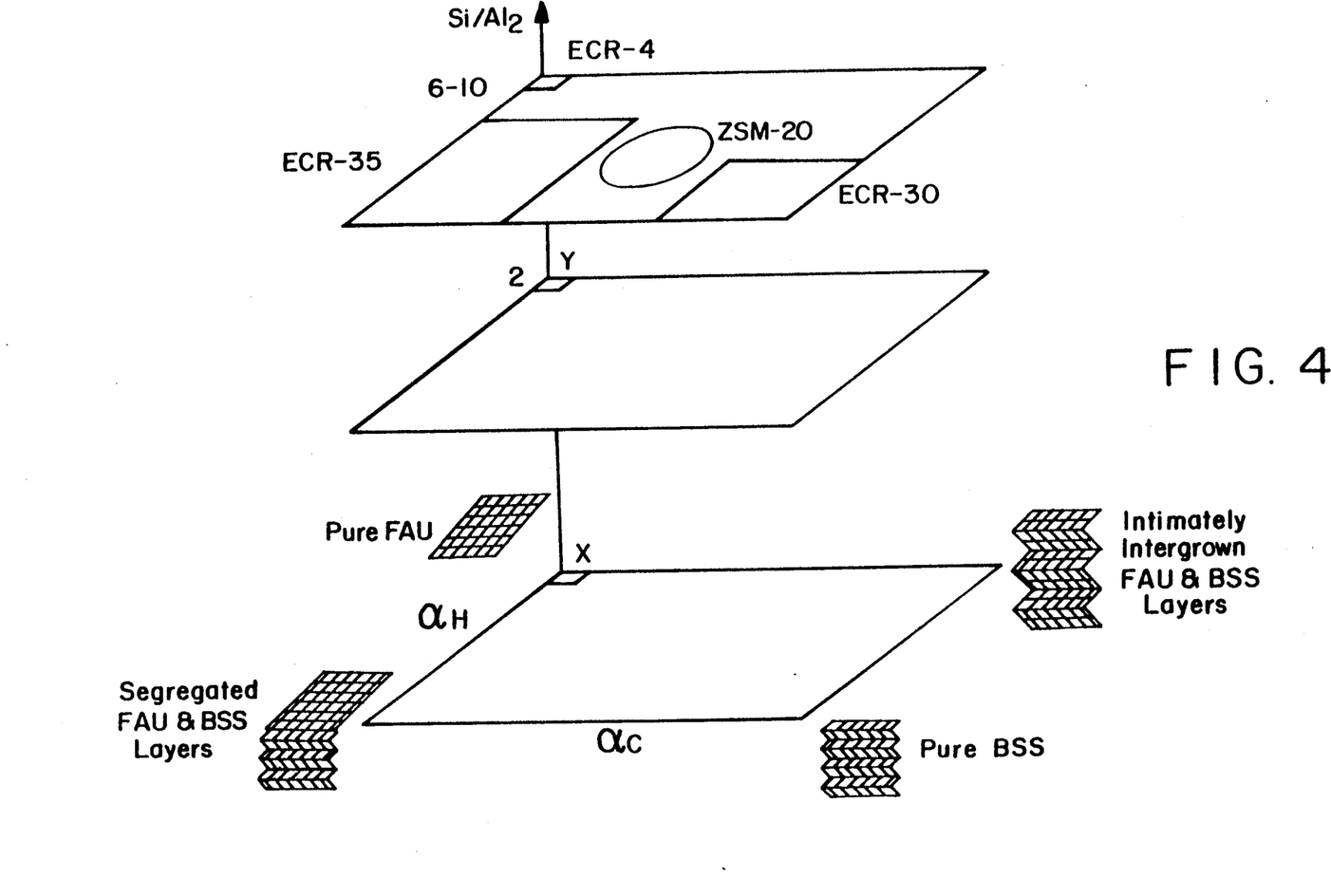
FIG. 4 is a graphical representation of the relationship between various zeolite intergrowth mixtures, their silica to alumina ratio (Si/Al$_2$) ratio and the coded matrix of FIG. 3, wherein the Si/Al$_2$ ratio is shown on the vertical (z) axis.

If the silicon to aluminum ratio of the composition is placed on a vertical axis, the three-dimensional matrix of FIG. 4 is formed, wherein both the composition and structure (determined by the coded matrix) of the zeolite are specified simultaneously. ECR-35 is based on the low values for $\alpha c$ and $\alpha H$ which is representative of crystals that mainly comprise blocks of one structure, at least several unit cells thick, stacked on another structure of similar thickness. Slivers of one structure within a block of another structure in the crystal, as observed in CSZ-1 or ZSM-20, are a minor volume fraction of the ECR-35 crystals. Therefore, infrequent structure reversals within a crystal are characteristic of ECR-35—the opposite of the theoretical ABABC... structure of FIG. 1, and the top right corner of FIGS. 2 and 3 where structure reversals occur almost after every unit cell. A silica to alumina ratio of 4 to 24 further restricts the range of structures that make up ECR-35.

High silica, large pore faujasite materials have been found to be particularly useful in cracking, hydrocracking (U.S. Pat. No. 4,036,739) and hydrocarbon reforming (U.S. Pat. No. 4,832,824). The aluminosilicate zeolite compositions herein may also be used as an absorbent or in other catalyst applications, such as paraffin isomerization, aromatization and alkylation. However, when used in this manner, the cations may be exchanged with cations from Groups II through VIII of the Periodic Table to remove any excess and undesirable sodium ions which may be present. Prior to an ion exchange the alkylammonium cations trapped in the super cages of the present structure may be removed by calcining the zeolite in an oxygen containing atmosphere which does not damage the cage structure of the zeolite. Such catalysts may be further modified or activated by impregnation with solutions of metal salts of Group I-VIII of the Periodic Table as illustrated in Kirk-Othmer Encyclopedia of Chemical Technology, Second Edition, Vol. 8 (1965).

In order to more fully illustrate the nature of the invention and the manner of practicing same, the following examples are presented. These examples are not to be construed as limiting the scope of the invention, as various changes will be apparent to those of ordinary skill in the art.

EXAMPLE 1

Synthesis of ECR-35

Figure 5:
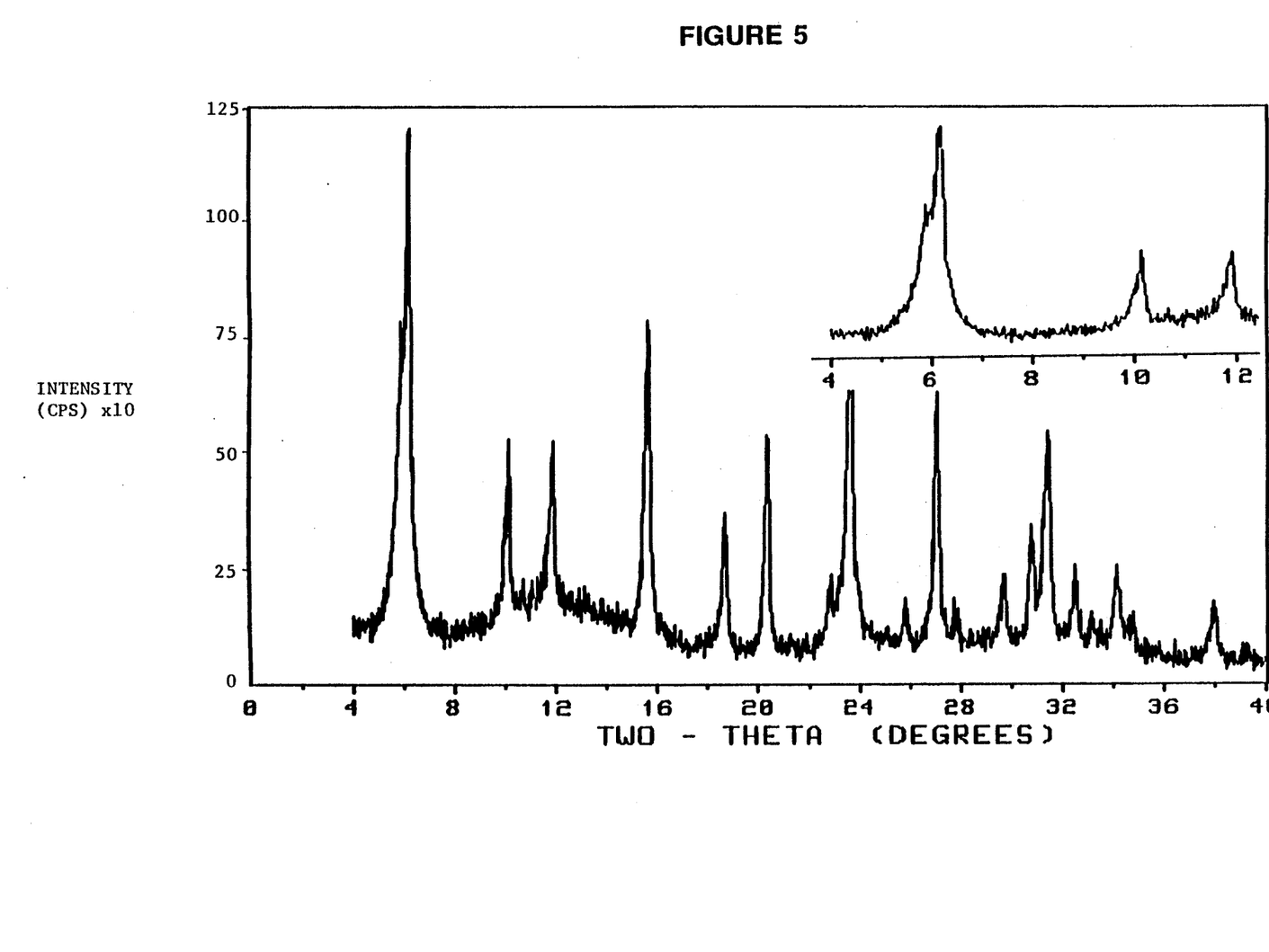
FIGS. 5 to 9 are experimental determined X-ray diffraction patterns of ECR-35 zeolite made according to the methods described in the Examples 1 to 9. The experimentally diffraction patterns are matched with a particular calculated diffraction pattern in the coded matrix of FIG. 3 to facilitate the identification of the particular intergrowth form of ECR-35. The inter-growth structure can be confirmed by high resolution electron microscopy.

The gel composition 10(TEA)$_2$O: 1.14 Na$_2$O: Al$_2$O$_3$: 24 SiO$_2$: 450 H$_2$O was prepared by mixing 208.5 g of colloidal silica (40 wt % SiO$_2$) with 23.3 g of a nucleation or seed solution described in U.S. Pat. Nos. 3,808,326 and 4,178,352, having a composition and molar ratio of 13.3 Na$_2$O: Al$_2$O$_3$: 12.5 SiO$_2$: 2C7 H$_2$O, and 439.6 g of a 40 wt % aqueous solution of tetraethylammonium hydroxide (TEAOH) in a laboratory blender. Next 51.2 g of a 21.7 wt % solution of sodium aluminate (1.14 Na$_2$O: Al$_2$O$_3$: 4 H$_2$) was added and 13.6 g of a 50 wt % solution of aluminum sulfate (17 H$_2$O). Water was added until the total weight of the solution reached 750 g. 100 g of the solution was placed in a 125 ml Teflon container and heated in an air oven for 34 hours at 100° C. to form crystals. The gel was cooled and the crystals were filtered and washed with distilled water. The product was then calcined to remove the TEA template and subjected to n-hexane adsorption to determine the amount of crystal product formed. The n-hexane adsorption capacity for the product was 16.0 wt %. The product was then shown to have the X-ray diffraction spectra shown in FIG. 5, which is characteristic of the diffraction pattern shown in element D2 of FIG. 3.

EXAMPLE 2

Synthesis of ECR-35 with Continued Mixing During Crystallization 650 g of the gel made in Example 1 was placed in a 1 liter glass reactor, equipped with a stirrer and a cooling condenser and heated, with a rheostat controlled heating mantle. The gel was continuously stirred for 35 hours to form crystals in a slurry. The slurry was cooled, and the crystals were filtered and washed. The X-ray diffraction pattern for the crystal product was similar to that obtained for the product in Example 1. A chemical analysis of the product gave a SiO$_2$:Al$_2$O$_3$ ratio of 5.5:1. The n-hexane adsorption capacity was 13.3 wt %.

EXAMPLE 3

Synthesis of ECR-35

The gel composition 10(TEA)$_2$O: 1.14 Na$_2$O: Al$_2$O$_3$: 24 SiO$_2$: 320 H$_2$O was prepared by adding 113.9 g of silica gel to 540.4 g of a 40 wt % aqueous solution of tetraethylammonium hydroxide (TEAOH) and 28.6 g of a nucleation or seed solution, described in U.S. Pat. Nos. 3,808,326 and 4,178,352, having a composition and molar ratio of 13.3 Na$_2$O: Al$_2$O$_3$: 12.5 SiO$_2$: 267 H$_2$O, in a laboratory blender. Next, 63.0 g of a 21.7 wt % solution of sodium aluminate (1.14 Na$_2$O: Al$_2$O$_3$: 4 H$_2$O) was added along with 16.8 g of a 50 wt % solution of aluminum sulfate (17 H$_2$O). Water was added until the total weight of the solution reached 750 g. The solution was thoroughly mixed to form a gel. 100 g of the gel was placed in a 125 ml Teflon container and heated in an air oven for 43 hours at 100° C. to form the product. The gel was cooled, and the crystals were filtered, washed and dried at 100° C. The X-ray diffraction pattern for the product was similar to that obtained for the product in Example 1 (i.e., element D2 of FIG. 3).

EXAMPLE 4

Synthesis of 0.91 Na$_2$O: 0.90(TEA)$_2$O: Al$_2$O$_3$: 5.54SiO$_2$ with Continued Mixing During Crystallization 650 g of the gel made in Example 3 was placed in a 1 liter glass reactor equipped with a stirrer and a cooling condenser. The gel was heated, with a rheostat controlled heating mantle, and continuously stirred for 35 hours. The gel was allowed to crystallize and a slurry product formed. The gel was cooled, and the crystals were filtered and washed. The X-ray diffraction pattern was similar to that obtained for the product in Example 1 and had a n-hexane adsorption capacity of 8.9 wt % after being calcined in air.

EXAMPLE 5

Figure 6:
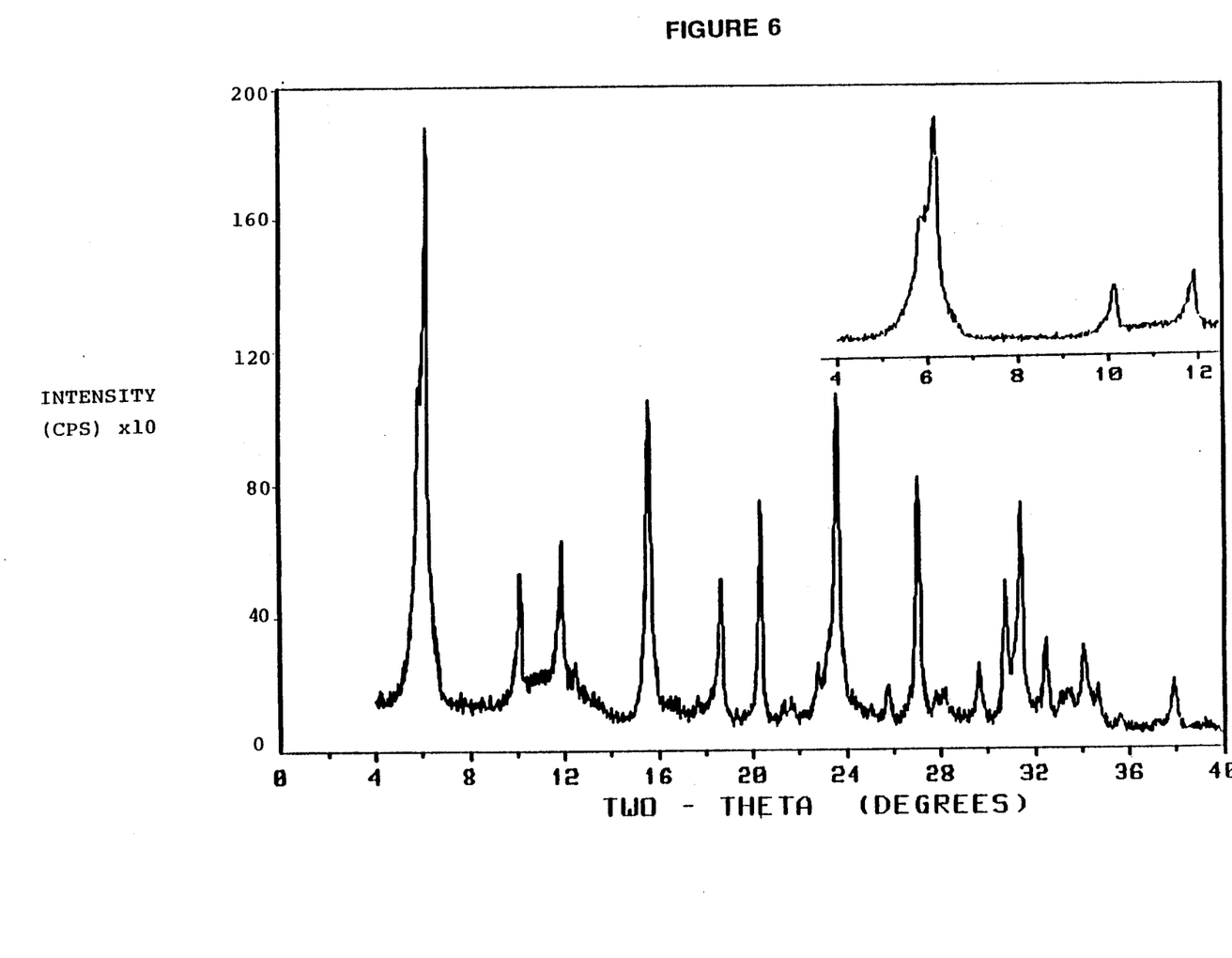

Synthesis of 0.91Na$_2$O: 0.90(TEA)$_2$O: Al$_2$O$_3$: 5.54SiO$_2$ with Fumed Silica The gel composition 10(TEA)$_2$O: 1.14 Na$_2$O: Al$_2$O$_3$: 24SiO$_2$:32OH$_2$O was prepared by blending 60.8 g of fumed silica with 288.2 g of a 40 wt % aqueous solution of tetraethylammonium hydroxide (TEAOH). Next, 15.2 g of a nucleation or seed solution, described in U.S. Pat. Nos. 3,808,326 and 4,178,352, having a composition and molar ratio of 13.3Na$_2$O: Al$_2$O$_3$: 12.5SiO$_2$: 267H$_2$O was added. 4.5 g of an aqueous aluminum sulfate (17H$_2$O) solution (dissolved in 9 g of H$_2$O) was added followed by 7.3 g of sodium aluminate (dissolved in 15 g of H$_2$O). The reagents were thoroughly mixed to form a gel which was placed in a 500 ml Teflon container and heated in an air oven for 22 hours at 100° C. to form crystals. The gel was cooled, and the crystals were filtered and washed. The X-ray diffraction pattern for the product is shown in FIG. 6 and is characteristic of the diffraction pattern shown in element D1 of FIG. 3. A chemical analysis of the product gave a SiO$_2$:AlO$_3$ ratio of 5.76 and a Na:Al ratio of 0.82. The n-hexane adsorption capacity for the product was 14.9 wt %.

EXAMPLE 6

Figure 7:
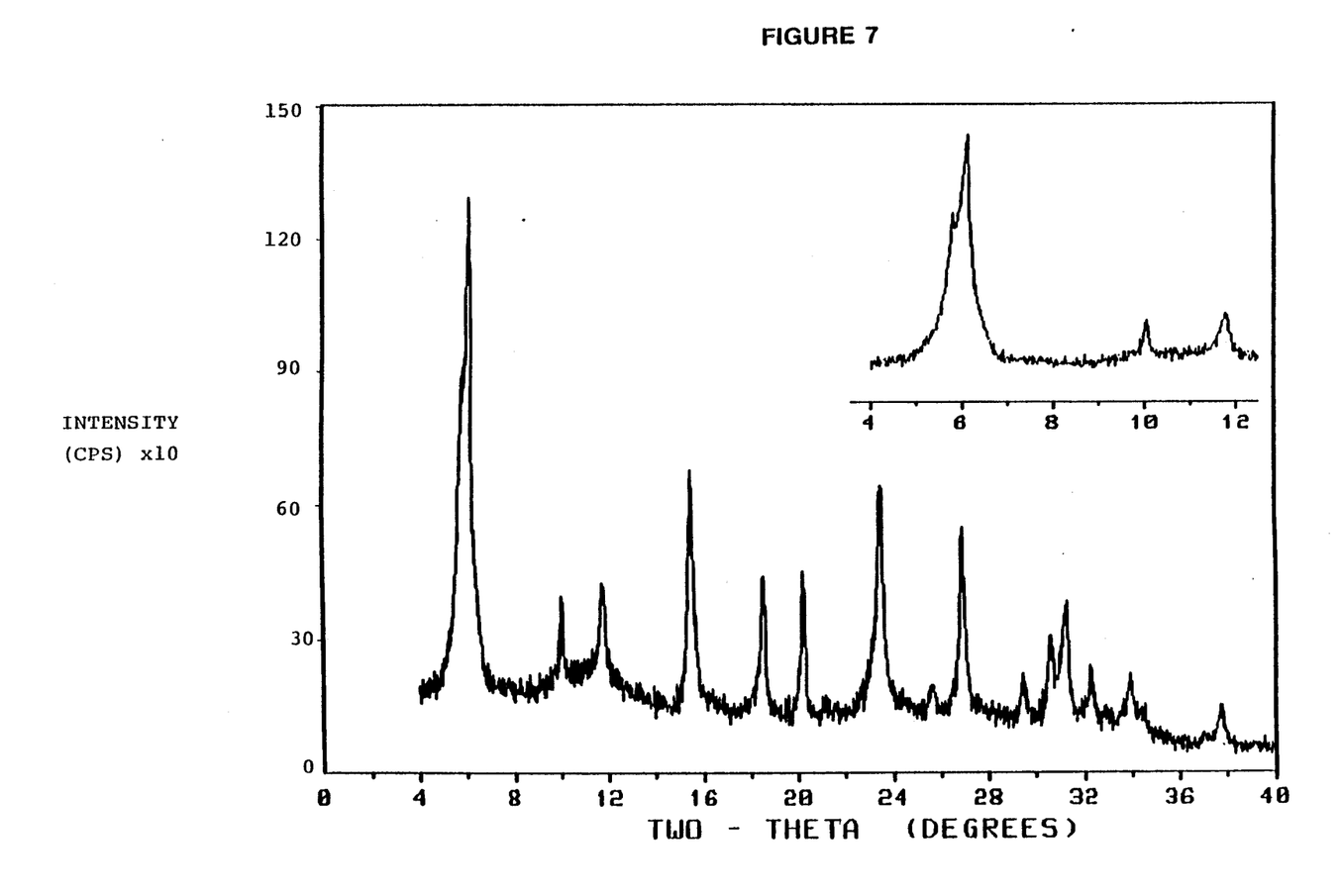

Synthesis of 0.91Na$_2$O: 0.90(TEA)$_2$O: Al$_2$O$_3$: 5.54SiO$_2$ with Silica Gel The procedure in Example 5 was followed except that the silica was replaced with silica gel having a −100 to +200 Tyler mesh size. The resulting gel was placed in a 500 ml Teflon container and heated in an air oven for 31 hours at 100° C. to form crystals. The gel was cooled, and the crystals filtered, washed and dried. The X-ray diffraction pattern for the product is shown in FIG. 7 and is characteristic of the diffraction pattern shown in element C2 of FIG. 3. A chemical analysis of the product gave a SiO$_2$:AlO$_3$ ratio of 7.7, a Na:Al ratio of 0.97 and showed trace amounts of NaP impurity.

EXAMPLE 7

Synthesis of 0.91Na$_2$O: 0.90(TEA)$_2$O: Al$_2$O$_3$: 5.54SiO$_2$ of ECR-35 with Silica Reactant The gel composition 10(TEA)$_2$O: 1.14 Na$_2$O: Al$_2$O$_3$: 24SiO$_2$: 32OH$_2$O was prepared by adding 81 g TEOS to 251.5 g of a 40 wt % aqueous solution of tetraethyl ammonium hydroxide (TEAOH) under vigorous mixing in a laboratory blender followed by 30.3 g of fumed silica (Cabosil M5). Next, 14.0 g of a nucleation or seed solution described in Example 1 was added. 3.9 g of an aqueous aluminum sulfate (17H$_2$O) solution (dissolved in 10 g of H20) was added along with 6.37 g of sodium aluminate (dissolved in 15.2 g of H$_2$O). Water was added until the total weight of the solution was 750 g. The hot reagents were thoroughly mixed for 1.5 hours to form a gel which was transferred to a closed 500 ml Teflon container and heated in an air oven for 12 hours at 100° C. in an air oven to form crystals. Next, half of the gel (Part A) was removed, cooled, and the crystals filtered and washed, the other half (Part B) was further reacted for an additional 7 hours then cooled, and the crystals filtered and washed. Parts A and B were then each analyzed for X-ray diffraction and n-hexane adsorption. For part A, the X-ray diffraction pattern was characteristic of the diffraction pattern shown in quadrant El of FIG. 3 and the n-hexane absorption capacity was 20.6 wt %. For part B, the X-ray diffraction pattern was characteristic of the diffraction pattern shown in element El of FIG. 3 and the n-hexene adsorption capacity was 20.4 wt %.

EXAMPLE 8

Synthesis of ECR-35 with Colloidal Silica

Figure 8:
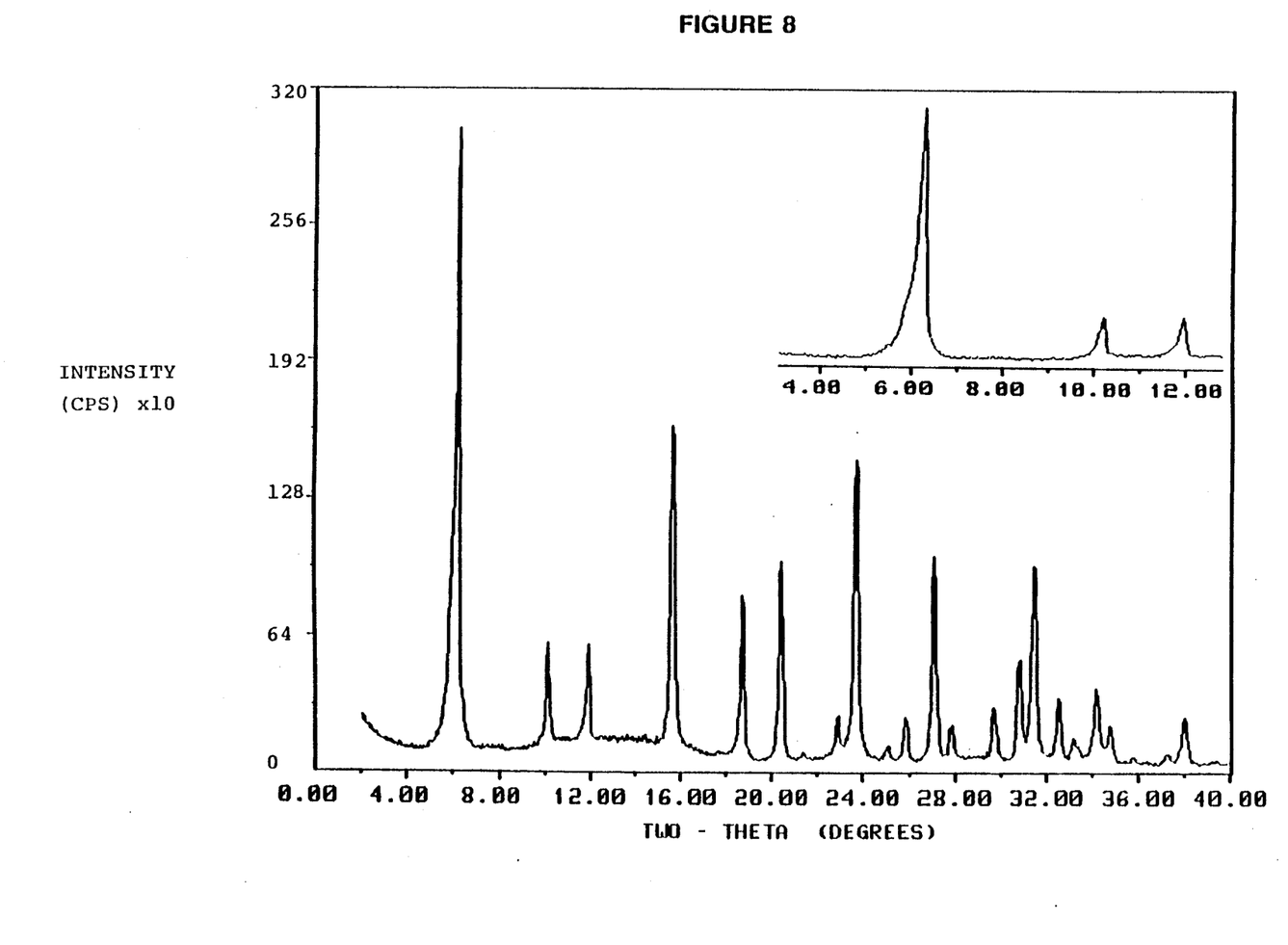

The gel composition 1.8TEA$_2$O: 0.6Na$_2$O: Al$_2$O$_3$: 9SiO$_2$: 135H$_2$O: 0.76 Na$_2$SO$_4$ was prepared by dissolving 4.12 g of Al$_2$O$_3$·3H$_2$O in 3.23 g of NaOH and 10 ml of H$_2$O and heating the solution on a hot plate while stirring. 47.7 g of a colloidal silica (40 wt % silica) was mixed with 4.71 g of a nucleation or seed solution described in Example 1. 48.1 g of a 40 wt % aqueous solution of tetraethylammonium hydroxide (TEAOH), sodium aluminate solution, and 5.95 g of an aqueous aluminum sulfate (17H$_2$O) solution (dissolved in 6 g of H$_2$O) were added. Water was added until the total weight of the solution reached 135 g. A slurry formed and it was transferred to a laboratory blender, thoroughly mixed, placed in a 125 ml Teflon container and heated in an air oven for 14 days at 100° C. The slurry was cooled and the crystals were filtered, washed with distilled water and dried at 115° C. The X-ray diffraction pattern for the product is shown in FIG. 8 and is characteristic of the diffraction pattern shown in element Cl of FIG. 3. A chemical analysis gave 4.93 wt % Na; 25.2 wt % Si and 7.48 wt % Al and a Si:Al ratio of 3.24.

EXAMPLE 9

Synthesis of ECR-35 with Methyltriethylammonium Cation

Figure 9:
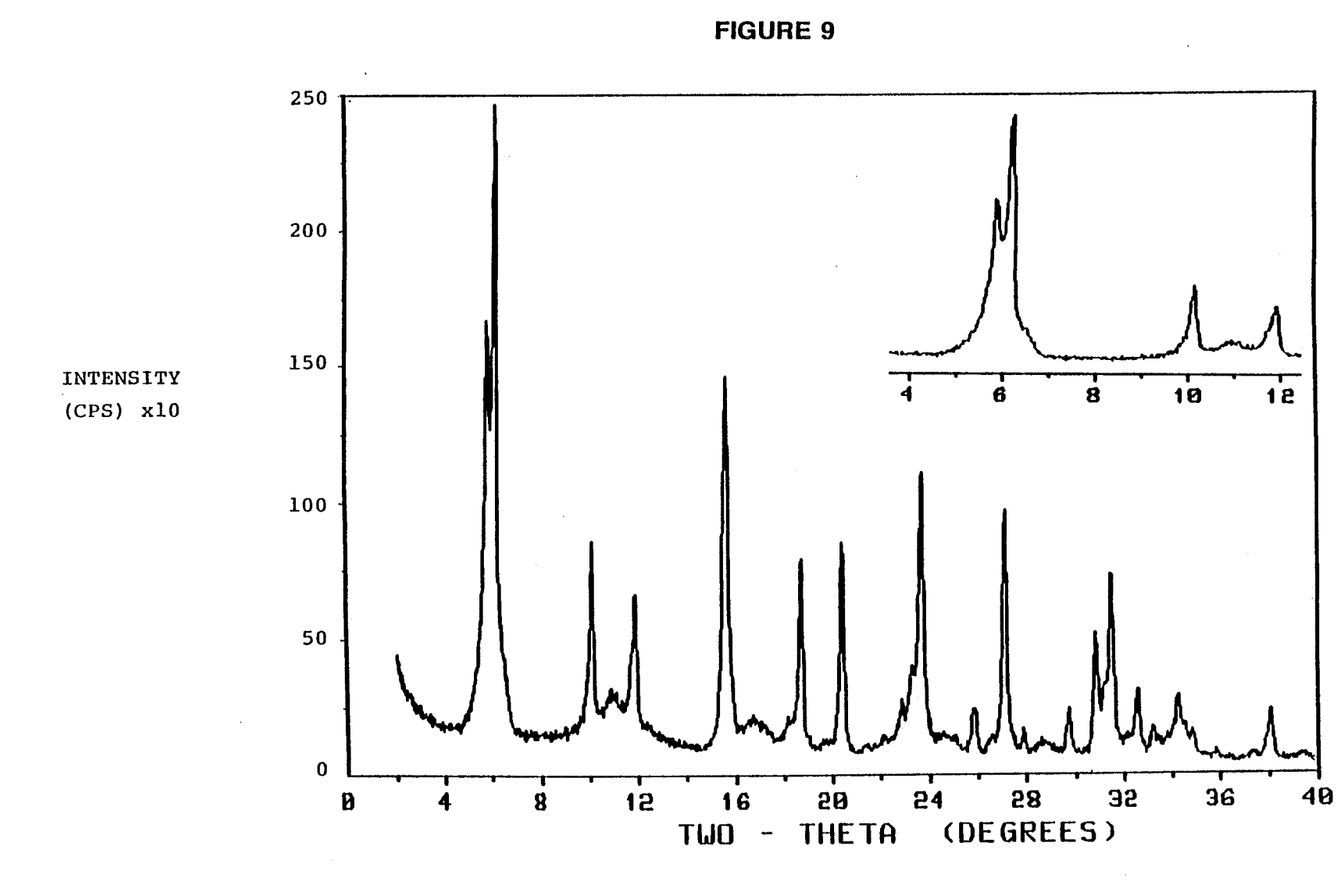

The gel composition 3.6 (Et$_3$MeN)$_2$)O: 1.2Na$_2$O: Al$_2$O$_3$:18SiO$_2$: 250 H$_2$O was prepared by dissolving 20.0 g of Al$_2$O$_3$·H$_2$O in 15.9 g of NaOH and 30 ml of 20.0 g of Al2O3.H20 in 15.9 g of NaOH and 30 ml of water and heating the solution on a hot plate while stirring. 176.7 g of silica gel was mixed with 19.4 g of a nucleation or seed solution described in Example 1, and the sodium aluminate solution made above. The entire solution was added to 11.5 g of an aqueous sulfate (17H$_2$O) solution (dissolved in 12 ml of water). Water was added until the total weight of the solution reached 1000 g. The mixture was thoroughly mixed in a laboratory blender, transferred to a 1000 ml Teflon container and heated in an air oven for 23 days at 100° C. Any gel that may have settled was reslurried daily until crystals formed. The crystals were filtered, washed with water and dried in an air oven at 115° C. The X-ray diffraction pattern for the product is shown in FIG. 9 and is characteristic of the diffraction pattern shown in element E2 of FIG. 3. A chemical analysis gave 3.30 wt % Na; 35.1 wt % Si and 6.94 wt % Al and a thermogravimetric analysis showed a combined weight loss of 12.0 wt % at 365° C. and 588° C. due to decomposition of the methyltriethylammonium cation. The product was calcined in air at 625° C. for 2 hours, and the n-hexane adsorption capacity was determined to be 20.9 wt %.

EXAMPLE 10

Synthesis of ECR-35

The gel composition 1.8 (Et$_3$MeN)$_2$O: 0.6 Na$_2$O: Al$_2$O$_3$: 9 SiO$_2$ 140 H$_2$O was prepared by dissolving 53.3 g sodium aluminate in 322.1 g methyltriethylammonium hydroxide (40% aqueous solution) and 100 g H$_2$O. The solution was vigorously blended with 355.5 g of a colloidal silica solution (40 wt.% silica) and 26.1 g seed solution described in Example 1. 30.4 g of Al$_2$(SO$_4$)$_3$·17-H$_2$O solution in 40 g H$_2$O was added. Water was added until the final weight of gel reached 1 Kg. The gel was reacted at 100° C. in a sealed Teflon jar for 15 days. The solution was cooled, and the crystals filtered, washed and dried in an air oven. Chemical analysis showed the product to have a Si/Al ratio of 3.81 and a X-ray diffraction pattern shown in element Cl of FIG. 3.

EXAMPLE 11

ECR-35 Catalyst 20 g of the product obtained in Example 10 was exchanged at 60° C. for one hour with a solution of 25 g NH$_4$Cl (dissolved in 200 g H$_2$O). After the exchange, the product was filtered, washed and returned to a beaker. The above steps were then repeated. The product was then dried at 120° C., and calcined at 350° C. for two hours. The above exchange step was repeated, followed by filtering, washing, drying and calcining. Chemical analysis showed that the Si/Al ratio was unchanged at 3.81, but that the Na/Al ratio was reduced to 0.04 and the n-Hexane adsorption at room temperature (44 torr) was 15 wt %.

15.6 g of this protonic product was added to a catalyst matrix slurry comprising 28.75 g colloidal silica, 200 g H$_2$O and 26.7 g kaolin and blended for 15 minutes. The slurry was then spray dried in a laboratory Buchi spray dryer. The catalyst was then used to crack 21.4 API gravity gas oil containing 2.65% sulfur. The results (in duplicate runs) are shown in Table 4. The results were compared with similar test results for an identical catalyst made with an LZY-82 (Union Carbide Corp.) commercial cracking catalyst promoter having a similar Si/Al ratio to the ECR-35, but made by steam calcination and dealumination of a conventional Y type faujasite. The ECR-35 product shows a distinct coke selectivity advantage over the commercial promoter.

TABLE 4

|  | ECR-35 | | LZY-82 | |
| --- | --- | --- | --- | --- |
| Conv. wt % | 61.01 | 62.35 | 61.87 | 62.37 |
| H$_2$ wt % | 0.03 | 0.05 | 0.03 | 0.03 |
| Dry Gas wt % | 0.99 | 0.95 | 0.95 | 0.98 |
| Total C$_3$ wt % | 3.79 | 3.81 | 3.77 | 3.93 |
| C$_3$= wt % | 3.13 | 3.18 | 3.06 | 3.25 |
| Total C$_4$ wt % | 7.39 | 7.75 | 7.66 | 7.81 |
| IC$_4$ wt % | 3.09 | 3.12 | 3.36 | 3.25 |
| C$_4$= wt % | 3.79 | 4.13 | 3.72 | 4.02 |

TABLE 4-continued

|  | ECR-35 |  | LZY-82 |  |
|---|---|---|---|---|
| $C_5+$ Gaso. wt. | 46.88 | 48.15 | 47.16 | 47.56 |
| $C_5+$/Conv. | 0.77 | 0.77 | 0.76 | 0.76 |
| LCO wt % | 22.24 | 22.54 | 21.73 | 21.94 |
| G + O wt % | 69.12 | 70.69 | 68.88 | 69.50 |
| HCO wt % | 16.75 | 15.12 | 16.40 | 15.69 |
| Coke wt % | 1.93 | 1.64 | 2.31 | 2.05 |
| Rec wt % | 98.55 | 103.46 | 102.39 | 101.09 |

What is claimed is:

1. A synthetic large pore crystalline metalsilicate zeolite composition, designated as ECR-35, having the formula, expressed in term of mole ratio of oxides:

(0.05–0.50) $T_2O$: (0.50–0.95) $Na_2O$:
$X_2O_3$: (4–24) $SiO_2$: (0–25) $H_2O$ where T is an organic cation selected from the group consisting of tetraethylammonium and methyltriethyl ammonium, and mixtures thereof and X is Al or Ga; wherein the composition consists of an X-ray diffraction pattern having the line intensities:

| Line # | d(Å) | Intensity |
|---|---|---|
| (1) | 15.00 ± 0.2 | weak to very strong |
| (2) | 14.20 ± 0.2 | very strong |
| (3) | 13.40 ± 0.2 | weak to medium |
| (4) | 8.70 ± 0.2 | medium |
| (5) | 8.03 ± 0.2 | zero to medium |
| (6) | 7.40 ± 0.15 | medium |
| (7) | 5.65 ± 0.15 | medium-strong | and wherein the intensity of line (2) is greater than line (1) which is substantially greater than the intensity of line (3); and wherein the intensity of line (4) is substantially greater than the intensity of line (6) which is greater than the intensity of line (5).

2. The composition of claim 1 wherein the X-ray diffraction pattern is characteristic of matrix code row C, column 1, and row C, column 2, of FIG. 3.

3. The composition of claim 1 wherein the X-ray diffraction pattern is characteristic of matrix code row D, column 1, and row D, column 2, of FIG. 3.

4. The composition of claim 1 wherein the X-ray diffraction pattern is characteristic of matrix code E, column 1, code E, column 2, and code E, column 3, of FIG. 3.

5. The composition of claim 1 wherein the X-ray diffraction pattern is characteristic of matrix code F, column 1, code F, column 2, and code F, column 3, of FIG. 3.

6. The composition of claim 1 wherein the cations are exchanged with salts of Groups I-VIII elements of the Periodic Table, hydrogen and ammonium.

7. The composition of claim 6 calcined at temperatures above 300° C. before the cations are exchanged thereby rendering a hydrocarbon conversion catalyst.

8. The composition of claim 7, wherein the cations are exchanged with rare-earth cations and mixed with inorganic oxide binders or matrices thereby rendering a hydrocarbon conversion catalyst.

9. A method for making the crystalline aluminosilicate zeolite composition, designated as ECR-35, having the formula, expressed in term of mole ratio of oxides:

(0.05–0.50) $T_2O$: (0.50–0.95) $Na_2O$:
$X_2O_3$: (4–24) $SiO_2$: (0–25) $H_2O$ where T is an organic cation selected from the group consisting of tetraethylammonium and methyltriethyl ammonium, and mixtures thereof; and where X is Al or Ga or a mixture thereof; wherein the composition consists of an X-ray diffraction pattern having the line intensities:

| Line # | d(Å) | Intensity |
|---|---|---|
| (1) | 15.00 ± 0.2 | weak to very strong |
| (2) | 14.20 ± 0.2 | very strong |
| (3) | 13.40 ± 0.2 | weak to medium |
| (4) | 8.70 ± 0.2 | medium |
| (5) | 8.03 ± 0.2 | zero to medium |
| (6) | 7.40 ± 0.15 | medium |
| (7) | 5.65 ± 0.15 | medium-strong | and wherein the intensity of line (2) is greater than line (1) which is substantially greater than the intensity of line (3); and wherein the intensity of line (4) is substantially greater than the intensity of line (6) which is greater than the intensity of line (5) comprising:

(a) mixing a particulate silica source, preferably selected from the group consisting of colloidal silica, particulate silica, fumed silica and aqueous colloidal silica solutions, with a soluble alumina or gallium oxide solution selected from the group consisting of solutions of sodium aluminate, aluminum sulfate, aluminum chloride, aluminum nitrate, sodium galliumate, gallium sulfate, gallium chloride, gallium nitrate salts, and mixtures thereof, a template seeding solution, and sodium and tetraethylammonium and/or methyltriethylammonium hydroxide to form a gel;

(b) heating the gel at temperature ranging from about 90° C. to about 140° C. and for a time sufficient to form crystals; and (c) recovering the crystals and removing the template from the zeolite.

10. The method in claim 9 wherein the gel has the composition:

(1.5–12) $T_2O$: (0.6–3) $Na_2O$ : $X_2O_3$: (8–30) $SiO_2$: (100–600) $H_2O$ where T is at least one ammonium salt selected from the group consisting of tetraethylammonium and methyltriethylammonium organic cations and X is Al or Ga or a mixture thereof.

11. The method in claim 10 wherein the gel has the composition: n 1.8–11) $T_2O$: (0.6–2) $Na_2O$: $X_2O_3$: (9–26) $SiO_2$:(130–450) $H_2O$.

12. The method of claim 9 wherein the particulate silica source is a colloidal silica.

13. The method of claim 9 wherein the particulate silica source is silica gel.

14. The method of claim 9 wherein the particulate silica source is fumed silica.

15. The method of claim 9 wherein the alumina or gallium oxide solution is selected from the group consisting of solutions of sodium aluminate, aluminum sulfate, aluminum chloride, aluminum nitrate, sodium galliumate, gallium sulfate, gallium chloride, gallium nitrate salts, and mixtures thereof.

16. The method of claim 15 wherein the alumina or gallium oxide solution is selected from the group consisting of alumina sulfate, aluminum nitrate, gallium sulfate and gallium nitrate salts.

17. The method of claim 9 wherein the gel is reacted at temperatures ranging from about 95° C. to about 120° C.

18. The method of claim 9 wherein the gel is reacted for about 8 hours to about 30 days.

19. The method of claim 18 wherein the gel is reacted for about 8 hours to about 3 days.

* * * * *